July 12, 1938.  A. PFAU  2,123,835
VALVE STRUCTURE
Filed July 29, 1936
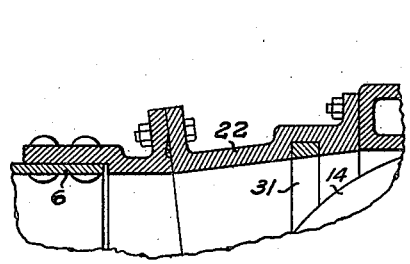
Fig. 2
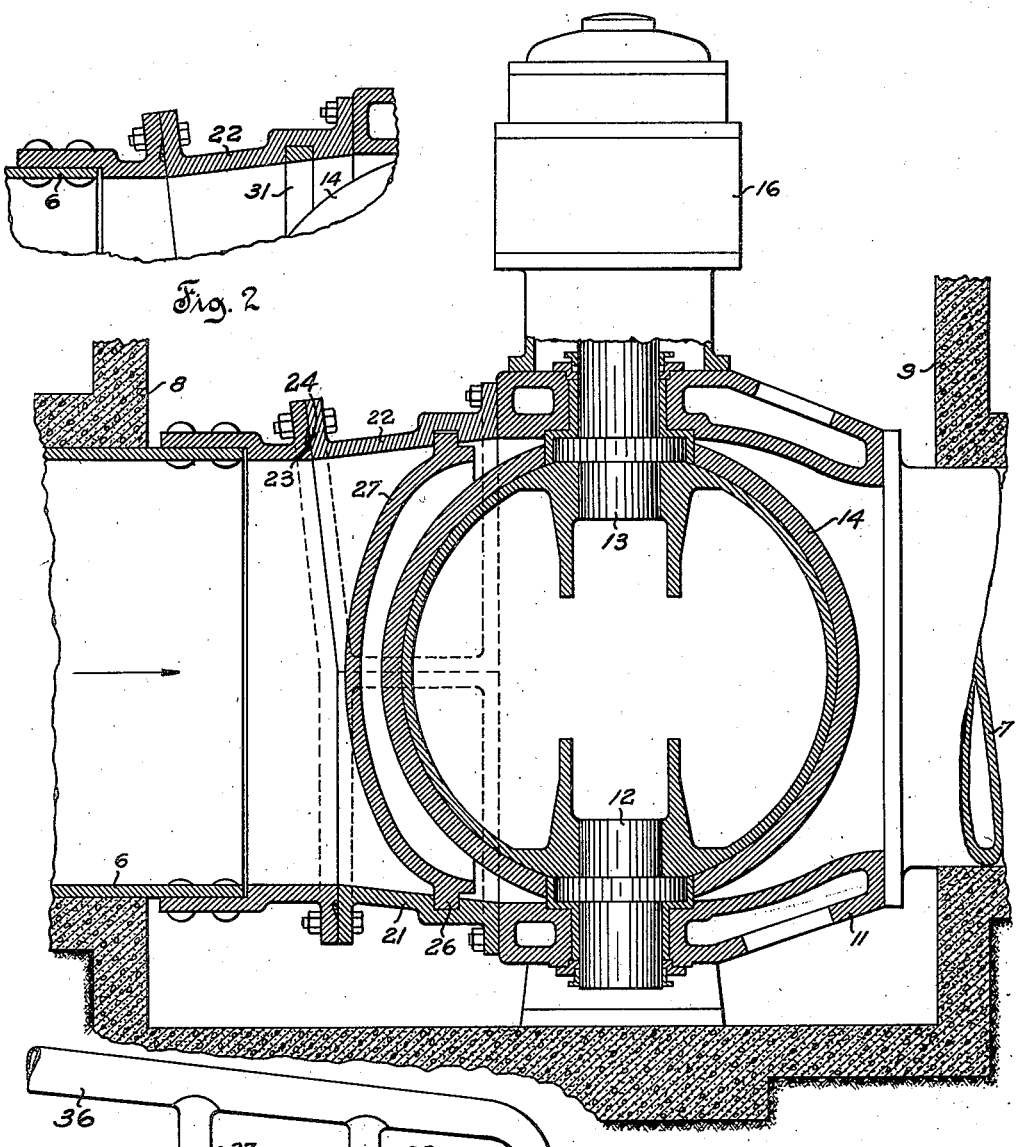
Fig. 1
Fig. 3
Inventor
A. Pfau
by
Attorney Patented July 12, 1938

2,123,835

UNITED STATES PATENT OFFICE 2,123,835

VALVE STRUCTURE

Arnold Pfau, Milwaukee, Wis., assignor to Allis-Chalmers Manufacturing Company, Milwaukee, Wis., a corporation of Delaware Application July 29, 1936, Serial No. 93,155

14 Claims. (Cl. 137—69)

This invention relates to improvements in the construction of means for controlling the flow of fluid through a supply pipeline and particularly to means used in connection with the shutting off of any feeder conduit and permitting the removal of a valve in said feeder conduit connected with the supply pipeline without extended interruption of the flow through the supply pipeline and permitting the refilling of such pipeline with fluid when flow thereof is not required in said feeder conduit which is shut off.

In pipeline systems for supplying a flow of fluid to a plurality of given fluid using points and particularly in penstocks for supplying a plurality of hydraulic turbines or other water using means from a single source of supply, it is necessary to provide valves controlling the flow of water to each of such several water using means. Such valves, however, especially in hydraulic power installations, are of extremely large size even when employed in the branches of the conduit feeding the individual turbines rather than in the main supply penstock and frequently require repair particularly of the operating and of the sealing means for such valves. Such repairs are increasingly difficult to make as the size of the valves is increased and accordingly require increasingly longer periods of time during which, under the present practice and with the present construction of such valves, the entire pipeline system must be shut off and drained. In most cases it is very undesirable to shut off the main penstock for the entire length of time required to complete work on any one valve or its associated turbine thus interrupting operation of all units connected therewith and for the further reason that such penstocks, particularly when exposed to the sun, are subject to wide temperature variations which, at best, produce stresses in the penstock and may even cause destruction of the penstock. It is also undesirable to employ large size valves in closing off the otherwise open ends of feeder pipes which are not used at the present time. Some means must accordingly be provided by which to minimize the time during which an entire pipeline system must be shut off and drained while repairs or replacements are being made on any one portion thereof.

It is, therefore, among the objects of the present invention to provide means which are readily applicable to fluid flow pipelines and particularly to pipelines of large size, by which the flow of fluid through such pipelines may be prevented for any desired period of time.

Another object of the invention is to provide means for preventing fluid flow through pipelines which means may be designed in part to form a portion of the pipelines and may be employed therein without requiring structural changes in such pipelines.

Another object of the invention is to provide means for shutting off fluid flow pipelines in which the means will not affect fluid flow conditions and will prevent excessive wear in the pipelines during periods when the flow preventing portion of such means is not employed.

Objects and advantages other than those above set forth, will be apparent from the following description when read in connection with the accompanying drawing in which:

Fig. 1 is a vertical diametrical sectional view of a portion of a fluid flow pipeline in which a fluid flow control valve is formed with and cooperates with means for shutting off the flow of fluid through the pipeline;

Fig. 2 is an enlarged view of a portion of the pipeline and the valve casing shown in Fig. 1 but illustrating the condition of such casing portion when the fluid flow preventing means is removed and when means are provided to prevent the disturbance of flow condition through and excessive wear within such pipeline; and Fig. 3 is a diagrammatic view illustrating a portion of a water flow conduit system in which a main supply penstock has connected thereto a plurality of branch pipelines by which water is supplied to a plurality of individual water using means.

Referring more particularly to the drawing by characters of reference, the reference numerals 6 and 7 designate the inlet and discharge portions, respectively, of a pipeline providing a path for the flow of a fluid therethrough. One of such pipeline portions may, of course, consist of a turbine or other water using means through which the flow of fluid is guided in a predetermined channel. As illustrated in the drawing, such pipeline 6, 7 is assumed to be employed for the transmission of fluid in considerable volume and under high pressure for which reason the pipeline portions 6 and 7 are each illustrated as being imbedded in separate supports or a continuous block 8, 9 of some suitable material such as concrete. The flow of fluid through pipeline 6, 7 is normally to be controlled by a valve herein illustrated as being of the oscillating or so-called butterfly type commonly used in larger conduits and comprising a valve casing 11 having stub shafts 12 and 13 extending thereinto to receive and to support the rotational movement of a valve body 14. Such valve is operated by any of the means known to the art and accordingly merely indicated in outline at 16. The details of construction of the valve being immaterial to the present invention, no further description thereof is deemed necessary.

It will be observed that the valve casing 11 is not of equal extent on opposite sides of the center line but that substantially equal extent is obtained by the interpositioning of a conduit comprised of a lower conduit portion 21 and an upper conduit portion 22 between the short side of the valve casing portion 11 and the pipeline section 6. The lower conduit portion 21 is in the form of a flanged semi-cylinder of approximately, at least, the same diameter as the diameter of the pipeline section 6 and of the adjacent portion of the valve casing 11. Such lower conduit portion is intended to be permanently located between the pipe section 6 and the valve casing 11 and the ends thereof are accordingly formed in planes at right angles to the longitudinal axis of the pipeline. The upper conduit portion 22 is also made as a semi-cylinder but at least one of the ends thereof is formed at an angle other than a right angle to the axis of the pipeline thus giving such a portion a somewhat wedge shaped form which facilitates removal and replacement thereof in fluid tight relation with respect to the pipeline section 6 and the valve casing 11. Either or both the flanges of the pipe section 6 and of the valve casing 11 are provided with a groove 23, of less size at its outer periphery than at its inner periphery, to receive a gasket 24 which is preferably toroidal in form and is accordingly compressed into the smaller outer portion of the groove 23 by fluid pressure acting between the several flanges. The conduit portions 21 and 22 are formed with complementary grooved sections in the inner surfaces thereof to form a single continuous groove 26 which is arranged to receive a bulk head member 27 or a filler ring 31.

The application of the present invention to a hydraulic power installation is shown in Fig. 3 in which numeral 36 designates a main supply pipeline or penstock leading from a source of water supply and arranged to deliver water pressure to a plurality of branch pipelines 37, 38, and 39 which are severally provided with valve structures 41, 42 and 43 such as above described and which control the flow of water to a plurality of hydraulic turbines 46, 47, and 48. In such installation it is necessary that the branches in which the valves and the turbines are in operating condition, be allowed to continue to supply water pressure to the turbines connected thereto during the time repair or replacement is occurring at an inoperative valve or turbine in another branch or, at least, that such branches be filled with water. The usual (and therefore not shown) headgate at the entrance to the penstock 36 is accordingly closed and the entire system downstream from such headgate is allowed to drain. The conduit portion 22 adjacent the defective valve or turbine is then removed, the filler ring 31 is removed and the bulk head 27 is inserted in the groove 26. Conduit portion 22 is then again inserted whereupon the headgate of the penstock 36 is reopened. Water then again fills the entire system excepting that portion thereof beyond the bulkhead 27 which has been inserted and the turbines other than the one to which the flow is blocked off by the bulk head, may again be put into operation and may continue to operate during the entire time work is being done on the defective or worn valve. Presence of water in the blocked branch then prevents wide temperature variations therein which would be dangerous to the structure.

The dimensions of the filler ring 31 are such as to completely fill the groove 26 while permitting ready insertion thereinto and removal therefrom. A smooth interior conduit surface is thus retained to prevent any disturbance of the flow streamlines therethrough such as would be occasioned by the presence of the unfilled groove 26, which would also cause wear and subsequent leakage about the bulk head.

When the bulk head is in the position shown in Fig. 1, the valve 14 may be opened, repaired or removed while the pressure on the bulk head retains the same tightly against the downstream wall of the groove 26 which minimizes the leakage about the bulk head. Such bulk head may also be used to close the end of a pipe section when such end is to be permanently closed without the use of a valve. It will be seen that the bulk head has a spherical form with the convex surface thereof in contact with the water pressure from upstream thus providing an arch effect to resist the water pressure and also providing a recess into which the valve 14 may swing when open.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a valve structure, a valve casing, a conduit attachable to said casing and having a removable substantially wedge shaped portion, a valve mounted for movement in said casing, and means removably mounted within and cooperating with the wedge shaped portion of said conduit to close off said conduit.

2. In a valve structure, an unsymmetrically shaped valve casing, a conduit attachable to said casing to substantially complete the symmetry of form thereof, a valve mounted for movement within said casing and into said conduit, and means removably mounted within and closing off said conduit.

3. In a valve structure, a valve casing, a conduit divided into a semi-cylindrical lower portion and a substantially wedge shaped upper portion attachable to said casing, a valve mounted for movement within said casing and into said conduit, and means removably mounted within and closing off said conduit.

4. In a valve structure, a valve casing, a conduit divided into substantially equal lower and upper portions having complementary grooves formed in the inner surfaces thereof, said conduit being attachable to said casing, and means removably mounted in the grooves in both portions and closing off said conduit.

5. In a valve structure, a valve casing, a conduit portion attachable to said casing, a valve mounted for movement in said casing, and a bulkhead shaped as a sector of a hollow sphere and removably mounted within and closing off said conduit portion and with the convex surface thereof facing upstream from said valve.

6. In a valve structure, a valve casing, a conduit attachable to said casing, a valve mounted for movement within said casing and into said conduit. and a bulkhead formed as a sector of a hollow sphere removably mounted within and closing off said conduit and with the convex surface thereof facing upstream from said valve.

7. In a valve structure, a valve casing, a conduit divided into a lower and an upper portion each having complementary grooves formed in the inner surfaces thereof, said conduit being attachable to said casing, and a spherical sector shaped bulkhead with a circular flange removably mounted in the grooves in said conduit to close the same off.

8. In a pipeline structure for conveying fluid under pressure, a plurality of pipeline sections, a conduit attachable to said sections and having a removable wedge shaped portion, and means removably mounted in and cooperating with said conduit including said wedge shaped portion for entirely closing off said conduit.

9. In a pipeline structure for conveying fluid under pressure, a plurality of pipeline sections, a conduit divided into a semi-cylindrical lower portion and a substantially wedge shaped upper portion attachable to said pipeline sections, and means removably mounted within said lower and upper conduit portions to close off the pipeline.

10. In a pipeline structure for conveying fluid under pressure, a plurality of pipeline sections, a conduit divided substantially along the center line thereof into a lower and an upper portion each having complementary grooves formed in the inner surfaces thereof, said conduit portions being attachable to said pipeline sections, and means removably mounted in the grooves in both portions for closing off the pipeline.

11. In a pipeline structure for conveying fluid under pressure, a plurality of pipeline sections, a conduit attachable to said sections and a bulkhead shaped as a sector of a hollow sphere removably mounted within said conduit with the convex side thereof facing upstream and closing off said conduit.

12. In a pipeline structure for conveying fluid under pressure, a plurality of pipeline sections, a conduit divided into a semi-cylindrical lower portion and a substantially wedge shaped upper portion attachable to said pipeline sections, and a bulkhead formed as a sector of a hollow sphere removably mounted within and closing off said conduit and with the convex surface thereof facing in the upstream direction in the pipeline.

13. In a pipeline structure for conveying fluid under pressure, a plurality of pipeline sections, a conduit divided into a lower and an upper portion each having complementary grooves formed in the inner surface thereof, said conduit being attachable to said pipeline sections, and a spherical sector shaped bulk head with circular flange removably mounted in the grooves in said conduit to close the same off.

14. In a pipeline structure for conveying fluid under pressure, a plurality of pipeline sections, a conduit attachable to said sections and divided into a plurality of portions provided with complementary grooves in the inner surfaces thereof, a bulkhead removably mounted within the grooves in and closing off said conduit, and a ring for insertion in the grooves when said bulk head is removed from said conduit.

ARNOLD PFAU.